(12) United States Patent
Weimerskirch (10) Patent No.: US 6,963,888 B2
(45) Date of Patent: Nov. 8, 2005

(54) METHOD AND APPARATUS FOR PREVENTING NOISE FROM INFLUENCING A RANDOM NUMBER GENERATOR BASED ON FLIP-FLOP META-STABILITY

(75) Inventor: André Weimerskirch, Eppstein (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 614 days.

(21) Appl. No.: 09/998,050

(22) Filed: Nov. 29, 2001

(65) Prior Publication Data

US 2003/0101205 A1 May 29, 2003

(51) Int. Cl.[7] ............................................... G06F 7/58
(52) U.S. Cl. .................................................... 708/250
(58) Field of Search ................................ 708/250–256

(56) References Cited

U.S. PATENT DOCUMENTS

| | | | |
|---|---|---|---|
| 5,963,104 A | 10/1999 | Buer | |
| 6,480,072 B1 * | 11/2002 | Walsh et al. | 708/250 |
| 6,631,390 B1 * | 10/2003 | Epstein | 708/250 |
| 2003/0023647 A1 * | 1/2003 | Epstein | |
| 2003/0236802 A1 * | 12/2003 | Epstein | |

FOREIGN PATENT DOCUMENTS

WO   WO0167231   9/2001

OTHER PUBLICATIONS

Method and apparatus for generating a random number using the meta-stable behavior of latches.*
Method and apparatus for decorrelating a random number generator using a pseudo-random sequence.*

* cited by examiner

Primary Examiner—Kakali Chaki
Assistant Examiner—Chat C. Do
(74) Attorney, Agent, or Firm—Kevin H. Fortin (57) ABSTRACT

A method and apparatus are disclosed for preventing noise from influencing a random number generator that is based on the meta-stable behavior of flip-flops. External noise will affect multiple flip-flops in a larger random number generator circuit in the same way, since they are physically close. Thus, the ability to influence the operation of a random number generator using external noise is reduced by incorporating a plurality of flip-flops, referred to herein as core random elements, in a single random number generator. If one of the core random elements in a random number generator is influenced by noise, all of the core random elements will be influenced by the noise. Thus, if all (or most) of the core random elements issue a random bit at the same time, there is a possibility that the random number generator was influenced by noise, and all the issued bits are discarded. One or more mechanisms are incorporated into the random number generator to ensure that a random bit is not generated when a plurality of the core random elements generate a bit at the same time.

1 Claim, 10 Drawing Sheets

METHOD AND APPARATUS FOR PREVENTING NOISE FROM INFLUENCING A RANDOM NUMBER GENERATOR BASED ON FLIP-FLOP META-STABILITY

CROSS-REFERENCE TO RELATED APPLICATIONS

The present invention is related to U.S. application Ser. No. 09/519,549, filed Mar. 6, 2000, entitled "Method and Apparatus for Generating Random Numbers Using Flip-Flop Meta-Stability," now U.S. Pat. No. 6,631,390; and U.S. application Ser. No. 09/912,685, filed Jul. 25, 2001, entitle "Method and Apparatus for Decorrelating a Random Number Generator Using a Pseudo-Random Sequence," each assigned to the assignee of the present invention and incorporated by reference herein.

FIELD OF THE INVENTION

The present invention relates to random number generation, and more particularly, to a method and apparatus for generating random numbers using flip-flop meta-stability.

BACKGROUND OF THE INVENTION

Many applications and electronic devices require random numbers, including games of chance, such as poker, roulette, and slot machines. In particular, numerous cryptographic algorithms and protocols depend on a non-predictable source of random numbers to implement secure electronic communications and the like. A random number generator should generate every possible permutation in the designated range of numbers. In addition, the random number generator should not be biased and should generate any given number and any sequence of numbers with the same probability as any other number or sequence of numbers. Moreover, the random number generator should generate random numbers that cannot be predicted, irrespective of the size of the collection of previous results. Thus, the random numbers should be completely unpredictable and non-susceptible to outside influences.

U.S. patent application Ser. No. 09/519,549, filed Mar. 6, 2000, entitled "Method and Apparatus for Generating Random Numbers Using Flip-Flop Meta-Stability," and U.S. patent application Ser. No. 09/912,685, filed Jul. 25, 2001, entitled "Method and Apparatus for Decorrelating a Random Number Generator Using a Pseudo-Random Sequence," disclose methods and apparatus for generating random numbers using the meta-stable behavior of flip-flops. A flip-flop is clocked with an input that deliberately violates the setup or hold times (or both) of the flip-flop to ensure meta-stable behavior. A bit is collected whenever there is an error.

While meta-stability occurs on a random basis, it has been found that the duration and occurrence of meta-stability may be affected by external noise (in general the behavior of the random element would be controlled by internal noise such as the thermal noise found in semiconductor devices). Thus, external noise may be used to influence the random number generator and thereby compromise the random nature of the generated numbers. A need therefore exists for a method and apparatus for generating random numbers using meta-stability that is not influenced by external noise.

SUMMARY OF THE INVENTION

Generally, a method and apparatus are disclosed for preventing external noise from influencing random number generators that are based on the meta-stable behavior of flip-flops. It has been observed that external noise can be used by an attacker to influence the operation of a random number generator that uses the meta-stable behavior of flip-flops. The present invention recognizes that external noise will affect multiple flip-flops in multiple random number generator circuits in the same way, since they are physically close.

Thus, according to one aspect of the invention, the ability to influence the operation of a random number generator using external noise is reduced by incorporating a plurality of flip-flops, referred to herein as core random elements, in a single random number generator. More specifically, the present invention recognizes that if one of the core random elements in a random number generator is influenced by noise, all (or most) of the core random elements will be influenced by the noise. Thus, if all (or most) of the core random elements issue a bit at the same time, there is a possibility that the random number generator was influenced by noise, and the issued bits are discarded. One or more mechanisms are thus incorporated into the random number generator to ensure that a random bit is not generated when a plurality of the core random elements generate a bit at the same time. Occasionally, both core random elements will generate a random bit at the same time, simply by chance, but discarding these bits will have a negligible effect on the overall efficiency of the system.

A more complete understanding of the present invention, as well as further features and advantages of the present invention, will be obtained by reference to the following detailed description and drawings.

DETAILED DESCRIPTION

The present invention recognizes that external noise will affect multiple flip-flops in a larger random number generator circuit in the same way, since they are physically close. Thus, the present invention reduces the ability to influence the operation of a random number generator using external noise by incorporating a plurality of flip-flops, implemented as a collection of core random elements, with each core random element 400 consisting of several flip-flops. The core random element is discussed further below in conjunction with FIG. 4.

Figure 4:
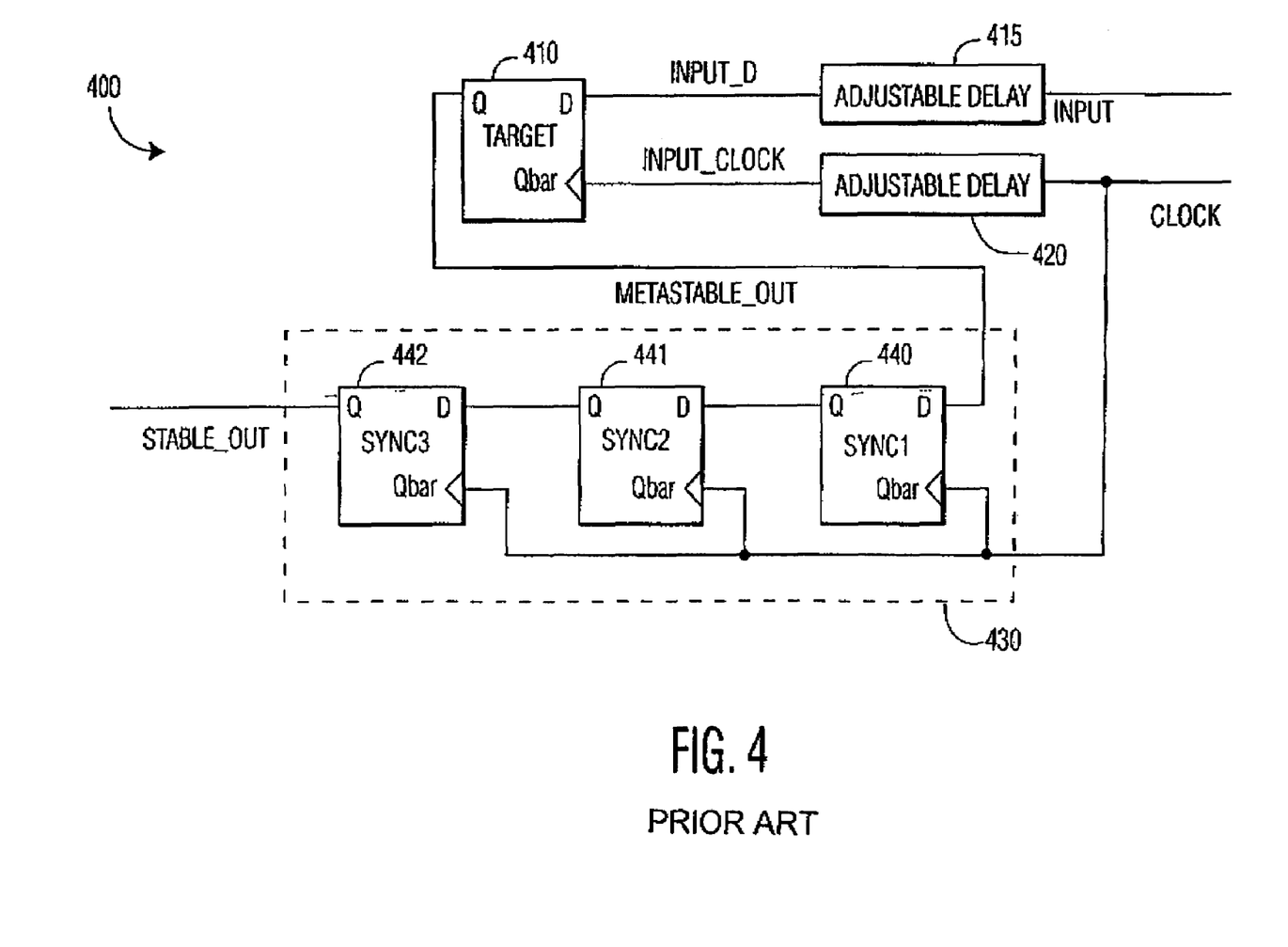
FIG. 4 illustrates a core random element that may be implemented using components of the random number generators 100, 200, discussed above in conjunction with FIGS. 1A, 1B and 2.

More specifically, the present invention recognizes that if one of the core random elements 400 is influenced by noise, all (or most) of the core random elements 400 will be influenced by the noise. Thus, if a number of the core random elements 400 issue a bit at the same time, as detected, for example, by an exclusive or gate ("XOR") or another gate that detects the issued bit, there is a possibility that the random number generator was influenced by noise, and the issued bit(s) are discarded. Thus, the present invention incorporates one or more mechanisms to ensure that a random bit is not generated when all (or most) of the core random elements 400 generate a bit at the same time.

The following discussion is organized as follows. First, a number of suitable core random elements are discussed in a section entitled "Random Number Generators Using Meta-Stable Flip-Flops." Thereafter, FIG. 4 illustrates a more general notion of a core random element 400 based, for example, on the random number generators 100, 200, discussed in conjunction with FIGS. 1 through 3. Finally, the noise-influence reduction techniques of the present invention are discussed in a section entitled "Preventing External Noise From Influencing a Random Number."

Random Number Generators Using Meta-Stable Flip-Flops

Figure 1A:
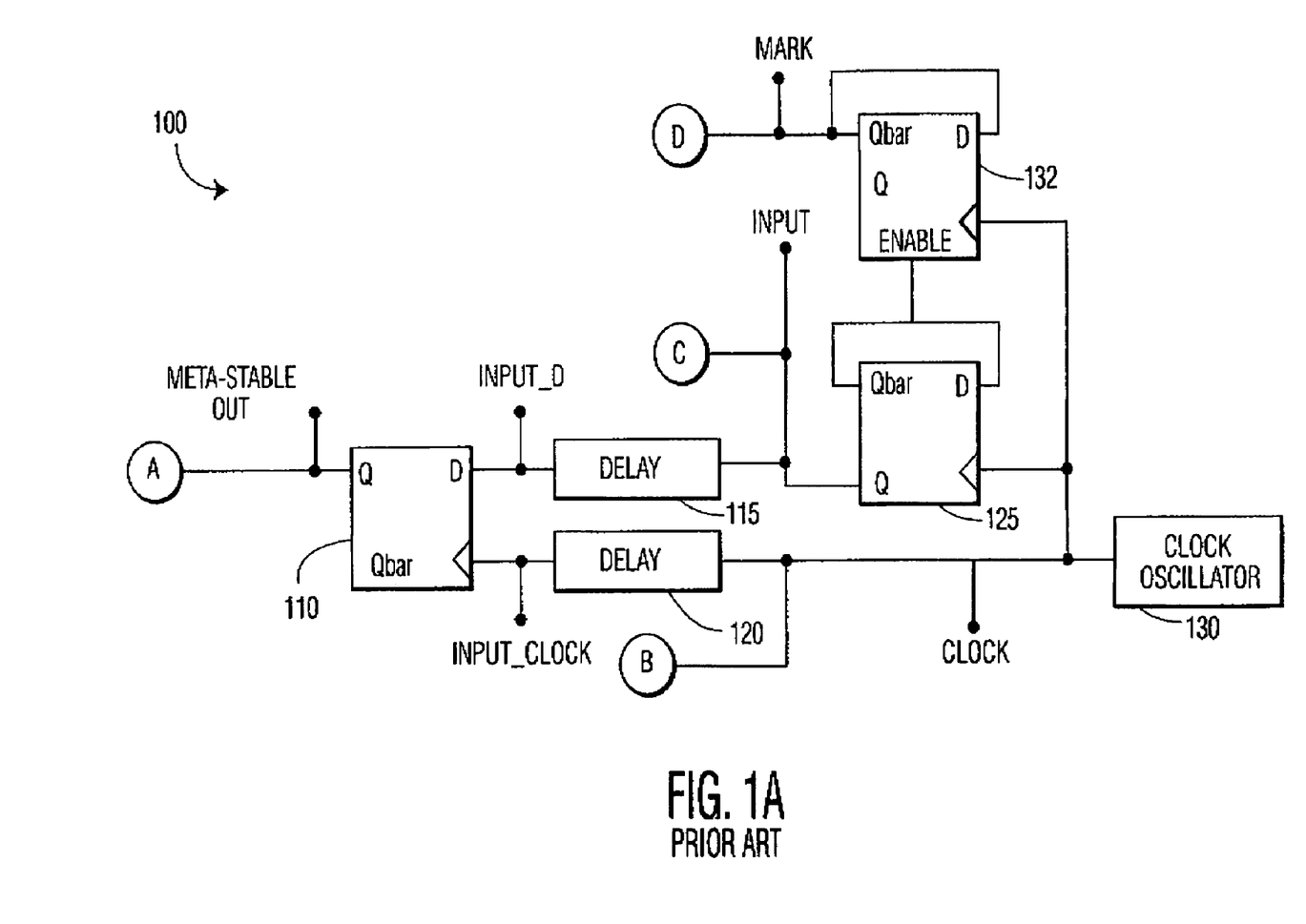
FIG. 1A illustrates a random number generator in accordance with the teachings of U.S. patent application Ser. No. 09/519,549, filed Mar. 6, 2000, entitled "Method and Apparatus for Generating Random Numbers Using Flip-Flop Meta-Stability;"

FIG. 1A illustrates a random number generator 100 in accordance with the teachings of U.S. patent application Ser. No. 09/519,549, filed Mar. 6, 2000, entitled "Method and Apparatus for Generating Random Numbers Using Flip-Flop Meta-Stability." The random number generator 100 provides an even distribution of random output bits by "marking" half of the zeroes as "ones" and the other half of the zeroes as "zeroes." In addition, half of the ones are marked as "ones" and the other half are marked as "zeroes."

As shown in FIG. 1A, the random number generator 100 includes a flip-flop 110, delays 115, 120, D-type flip-flops 125, 132 and a clock oscillator 130. The flip-flop 110 is clocked with an input that deliberately violates the setup or hold times (or both) of the flip-flop 110 to ensure meta-stable behavior. The setup or hold times can be violated, for example, using delays 115, 120. The flip-flop 110 can be embodied, for example, as a D, T or JK type flip-flop. In addition, the flip-flop 110 could be embodied as a simple latch and a slightly different circuit, as would be apparent to a person of ordinary skill in the art.

A clock signal is generated by a clock oscillator 130 and a D-type flip-flop 125 whose Qbar output is fed back into its D input to divide the clock by two. In this manner, the D-type flip-flop 125 operates in the same manner as a T-type flip-flop (toggled output), to provide a divide-by-two mechanism. Thus, the D input of the flip-flop 110 is driven by alternating ones and zeroes. An additional divide-by-two flip-flop 132 generates a Mark signal, shown in FIG. 1C, that marks half of the zeroes in the waveform, Input, as "ones" and the other half of the zeroes as "zeroes."

Figure 1B:
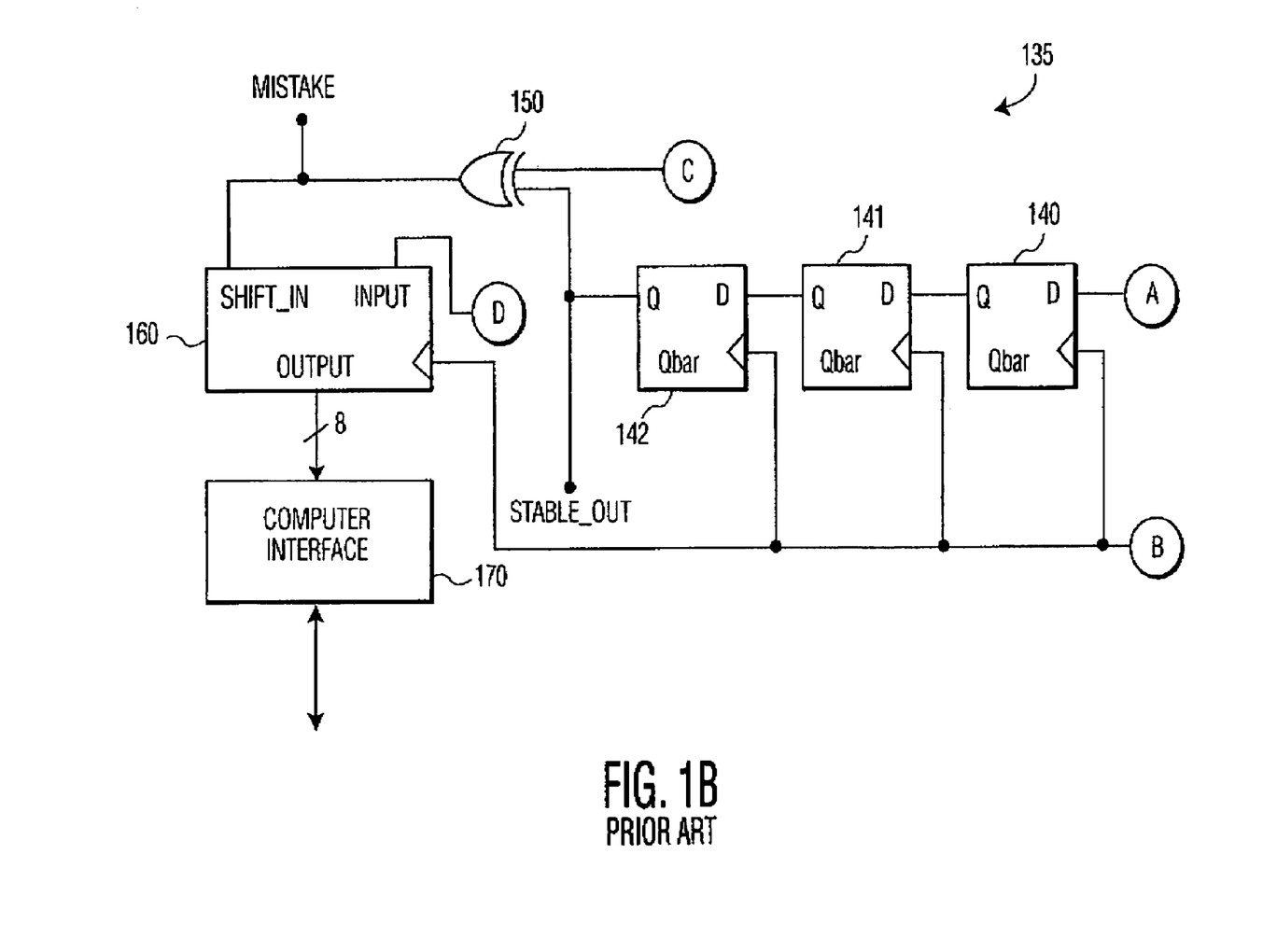
FIG. 1B illustrates a synchronizing circuit that may be utilized to synchronize the output of the random number generator of FIG. 1A with a clock source.
Figure 1C:
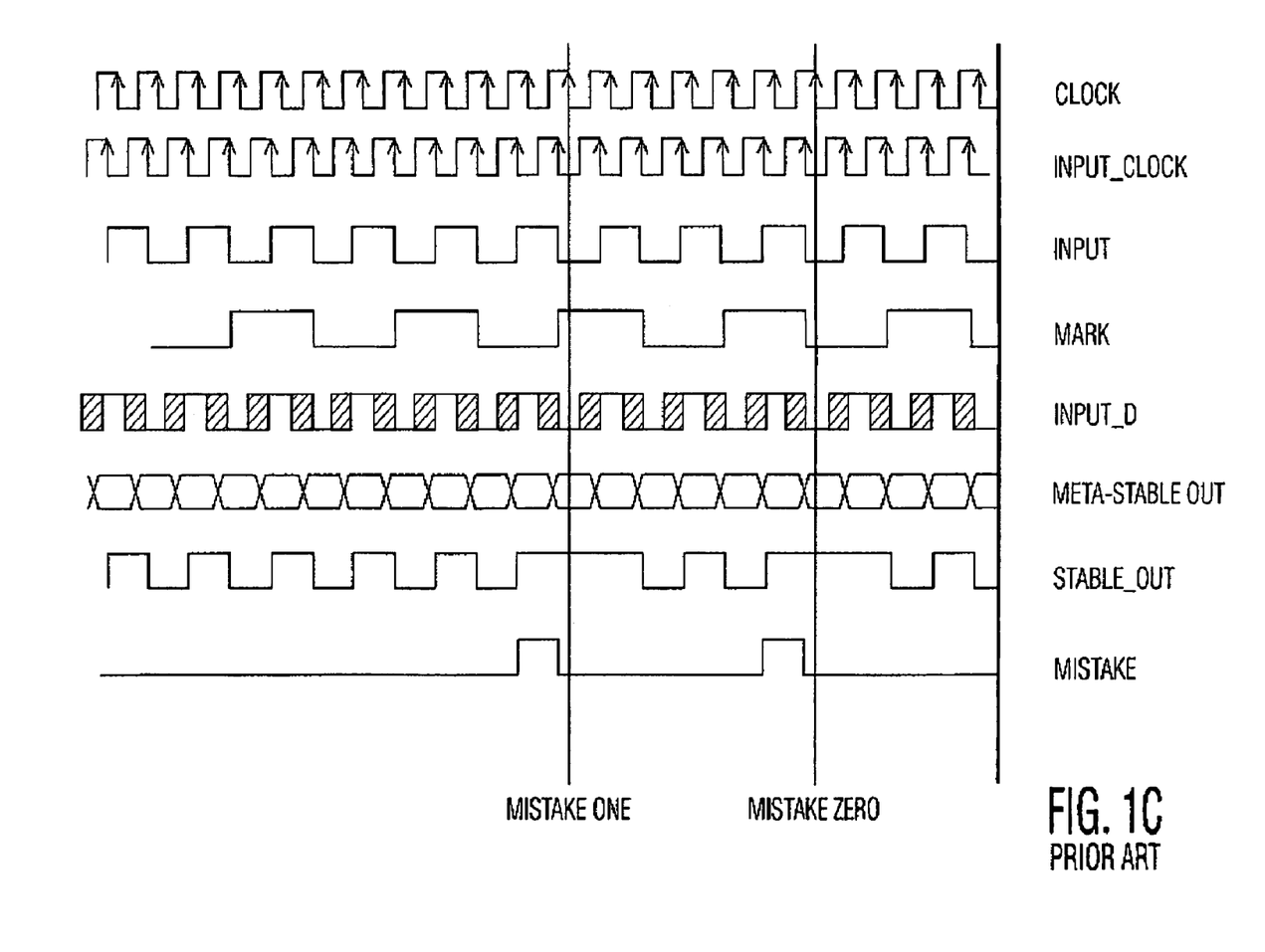
FIG. 1C illustrates a set of waveforms produced by the circuits of FIGS. 1A and 1B.

As seen most clearly in FIGS. 1A and 1C, the waveform Clock produced by the clock oscillator 130 is obtained at the sample point marked "Clock" in FIG. 1A. The waveform Input produced by the divide-by-two flip-flop 125 is obtained at the sample point marked "Input" in FIG. 1A. The waveform Input_D (having a violation of setup times for the flip-flops) produced by delay 115 and the waveform Input_clock produced by delay 120 are obtained at the corresponding sample points in FIG. 1A. The waveform Mark produced by the divide-by-two flip-flop 132 is obtained at the sample point marked "Mark" in FIG. 1A.

As shown in FIG. 1C, the violation of the setup or hold times (or both) by the delays 115, 120 ensures that the flip-flop 110 will exhibit meta-stable behavior, as demonstrated by the waveform Meta-stable out. As discussed further below, the meta-stable operation of the flip-flop 110 provides a mechanism for generating random numbers.

As a result of the delay from the delays 115, 120, the inherent delay in the flip-flop 110 itself, and most importantly from the non-uniform delay from the meta-stable behavior, the waveform Meta-stable out is not synchronized to the waveform Clock. Thus, to make the random number generator 100 of FIG. 1A suitable for synchronous applications, an illustrative mechanism is provided in FIG. 1B to synchronize the waveform Meta-stable out with the waveform Clock. It is noted that the circuitry of FIGS. 1A and 1B are connected by joining the bubbles of like letters.

The synchronizing circuitry 135 shown in FIG. 1B includes a number of serial flip-flops 140–142 that are selected so as to not enter a meta-stable state easily. In addition, if one of these flip-flops 140–142 does become meta-stable, the period of the clock signal should be long enough so that the output of the meta-stable flip-flop will settle to a fixed logic value (either 0 or 1), such that when the signal is sampled at the next flip-flop 140–142, the flip-flop is stable. In this manner, each flip-flop 140–142 improves the chance of synchronizing the waveform Meta-stable out with the waveform Clock, while removing any meta-stability. Indeed, the chances of incorrect behavior for such a circuit will be measured in tens of years.

The exclusive or gate ("XOR") 150 compares the synchronized version of waveform Meta-stable out, designated as Stable-out with the waveform Input (sampled at the output of the divide-by-two flip-flop 125). Since the output of the XOR gate 150 will be high if and only if two inputs differ, the output of the XOR gate 150 ("Mistake") will be high if the waveform stable_out does not match the input signal. This mistake can only occur if one of the flip-flops 110, 140, 141, 142 has made a mistake (which we assume occurs as a result of meta-stable behavior). The output of the XOR gate 150 ("Mistake") is applied to the shift input (Shift_in) of a shift register 160, and the shift register 160 will shift a bit over from the Mark signal every time there is a Mistake. Thus, the first embodiment collects a bit whenever there is an error (mistake).

The input line of the shift register 160 is connected to the Mark signal. In this manner, each time there is a Mistake, the shift register 160 will shift in a bit from the Mark signal. Thus, as shown in FIG. 1C, for mistake zero, a bit equal to one (based on the Mark signal) will be acquired. Similarly, for the mistake one, a bit equal to one (based on the Mark signal) will be acquired.

The random number generator 100 also marks the ones input to flip-flop 110 with a mark of either "one" or "zero". Thus, if a mistake occurs with the one value for the input, an even distribution of random bits will also be acquired due to mistakes made with that one value. Therefore, this circuit is insensitive to the bias between errors that occur in the one or zero input value.

As previously indicated, marking input bits in the manner discussed above in conjunction with FIGS. 1A through 1C provides an even distribution of random output bits. It has been found, however, that the duration and occurrence of meta-stability can be affected by noise. Thus, if the noise is correlated to the marking signal, then the output of the random number generator will not be random.

Thus, an unbiased (with regards to frequency of zeroes and ones) signal source is used as the marking signal. The marking signal is uncorrelated with a high probability to any noise in the system. A linear feedback shift register (LFSR) with sufficient length is employed to decrease the chance of correlation and reduce any bias in the LFSR output. Suitable LFSRs are described, for example, in Bruce Schneier, Applied Cryptography, pages 369–388 (Wiley, 1994).

Figure 2:
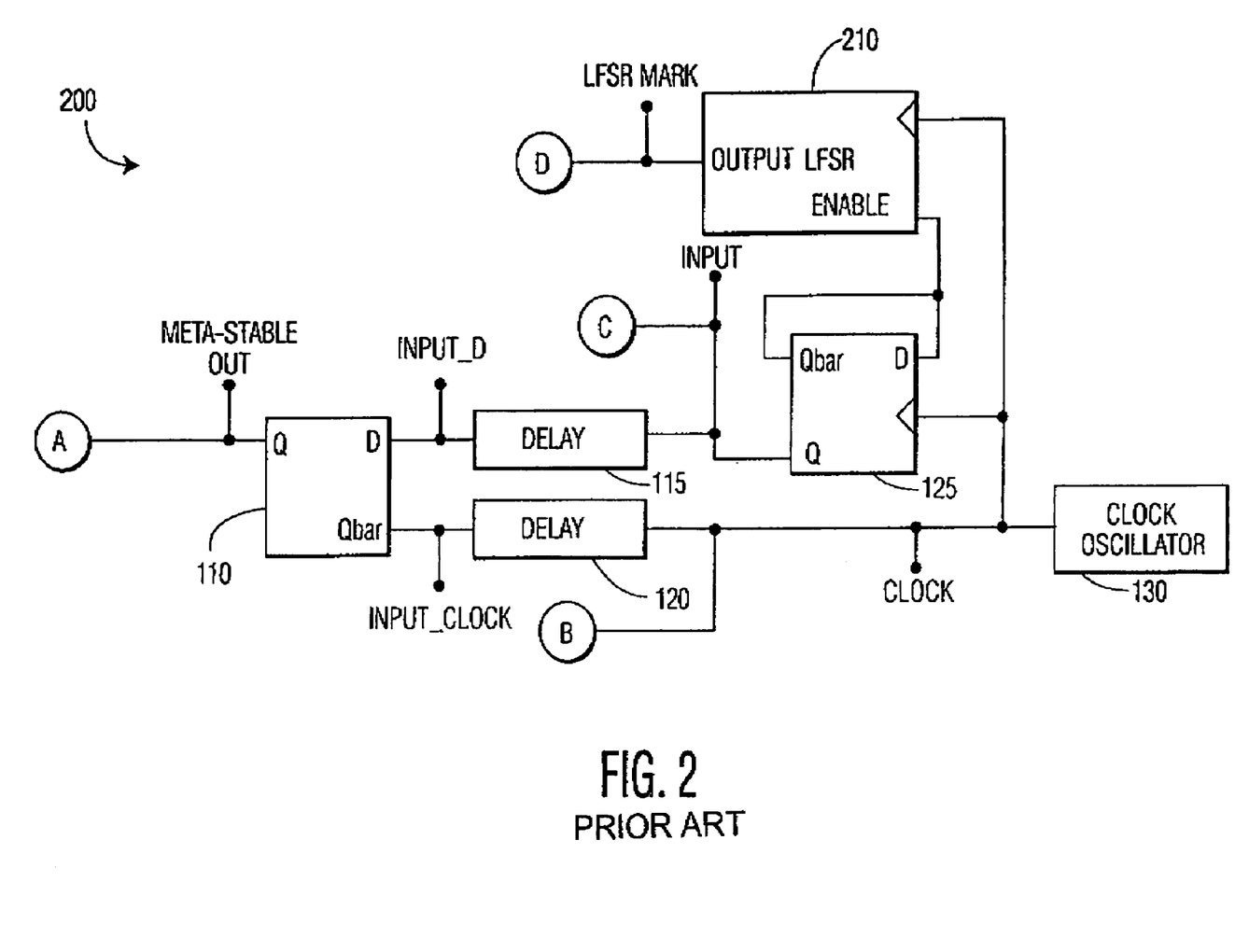
FIG. 2 illustrates an alternate random number generator in accordance with the teaching of U.S. patent application Ser. No. 09/912,685, filed Jul. 25, 2001, entitled "Method and Apparatus for Decorrelating a Random Number Generator Using a Pseudo-Random Sequence;"
Figure 3:
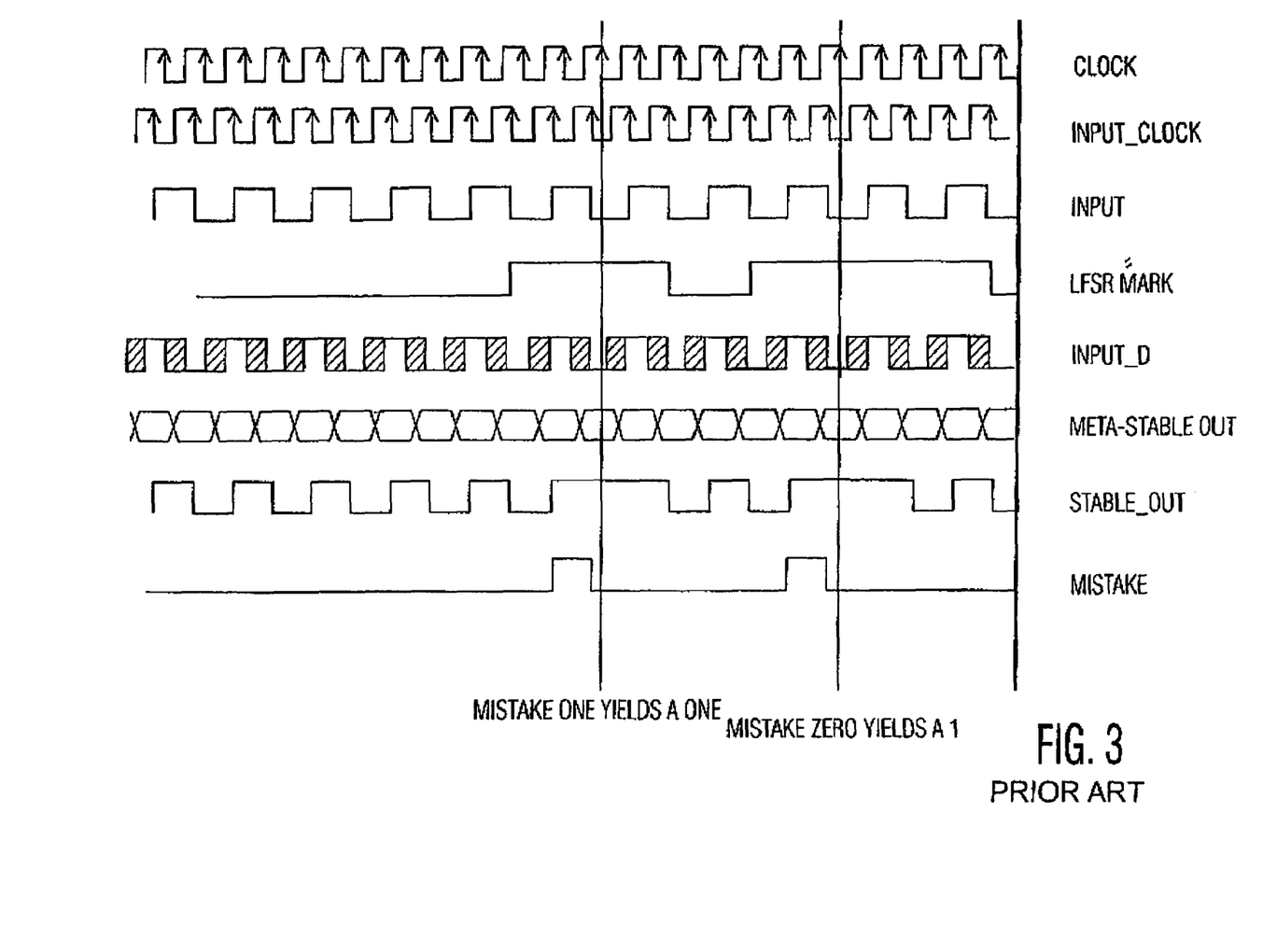
FIG. 3 illustrates a set of waveforms produced by the circuits of FIGS. 2 and 1B.

FIG. 2 illustrates a random number generator 200. As shown in FIG. 2, the random number generator 200 includes a flip-flop 110, delays 115, 120, a D-type flip-flop 125 and a clock oscillator 130 that operate in the same manner as described above in conjunction with FIG. 1A. In addition, the random number generator 200 includes a linear feedback shift register 210 that generates an LFSR Mark signal, shown in FIG. 3, that marks slightly more than half of the zeroes in the waveform, Input, as "ones" and almost half of the zeroes as "zeroes," that is uncorrelated to a high probability to any noise. The signal always has a slight bias since for an n bit LFSR there are only $2^n-1$ patterns (the all zeros pattern never occurs). This bias becomes insignificant if n is large.

Thus, the random number generator 200 of FIG. 2 replaces the marking flip flop 132 of FIG. 1A with the linear feedback shift register 210. The linear feedback shift register 210 may be embodied as described in Bruce Schneier, Applied Cryptography, pages 369–388 (Wiley, 1994). The random number generator 200 of FIG. 2 can be utilized with the synchronizing circuit 135 of FIG. 1B to synchronize the output of the random number generator 200 with a clock source.

As previously indicated, the linear feedback shift register 210 should provide a sufficient number of bits to decrease the chance of correlation and reduce any bias in the LFSR output. For a linear feedback shift register 210 comprised of n flip-flops, there will be $2^n-1$ binary numbers before the numbers begin to repeat. Thus, as the number of flip-flops in the linear feedback shift register 210 increases, the $-1$ in the $2^n-1$ binary expression becomes less significant. In any event, since the direction of any bias attributable to the $-1$ term is known, the bias can be removed or corrected with a suitable circuit.

Thus, the linear feedback shift register 210 provides a marking output, LFSR mark, that is pseudo-random, with half of the output bits being a zero and the other half of the output bits being a one.

It has been observed that if the linear feedback shift register 210 is insecure, a portion of the output (even a random portion) may allow the state of the linear feedback shift register 210 to be known. In this manner, it would be possible to predict the output of the random number generator 200. Thus, a linear feedback shift register 210 should be utilized that has no discernable statistics, thereby making the state information of the linear feedback shift register 210 useless. In a further variation, additional security is achieved by releasing the collected bits out of the shift register 160 and by allowing some of the collected bits to be lost in each collection interval.

The shift register 160 shifts a bit over from the Mark signal every time there is a Mistake. In this manner, the arrival times of the mistakes are not discerned, and someone cannot predict which bits of the linear feedback shift register 210 will be chosen.

Preventing External Noise From Influencing A Random Number

As previously indicated, the present invention recognizes that external noise will affect multiple flip flops on a board or in an integrated circuit in the same way, since they are physically close. Thus, according to one feature of the present invention, the ability to attack a random number generator using external noise is reduced by using two or more flip-flops, referred to herein as core random elements 400, in one random number generator. More specifically, the present invention recognizes that if one of the core random elements 400 is influenced by noise, they all will be. Thus, if all (or most) of the core random elements 400 issue bits at the same time, as detected, for example, by an exclusive or gate ("XOR") (or another gate that detects the emitted bit), there is a possibility that the random number generator was influenced by noise, and all the issued bits are discarded.

For example, if t is a threshold value greater than zero (0), and n is the number of flip flops, then a bit is generated if and only if (n/2+t) or less same results are generated by the meta-stable flip-flops. Likewise, a bit is not generated if more than (n/2+t) same results are generated by the meta-stable flip-flops. Thus, if n equals 10 flip-flops, and t equals two (2), then if eight (8) or more flip-flops have the same result then the bit is discarded. In addition, if n equals two (2) flip-flops, then the bit is discarded if all the flip-flops have the same result (by setting t greater than zero). In this manner, the present invention can provide a random number generator even when the flip-flops do not have an even t distribution of generating ones (1) and zeroes (0). If the probability that a meta-stable flip-flop will generate a one (1) is p, and the probability that the same meta-stable flip-flop will generate a zero (0) is 1−p, then a bit is discarded if more than p*n+t or less than p*n−t ones were issued. For example, if n equals 10, p equals 0.7, and t equals 1, then the bit is discarded if there were nine or more, or five or less, ones.

FIG. 4 illustrates a core random element 400 that may be implemented using, for example, components of the random number generators 100, 200, discussed above in conjunction with FIGS. 1A, 1B and 2. As shown in FIG. 4, the core random element 400 includes a flip-flop 410, variable delays 415, 420, and a synchronizing circuit 430. A clock signal is generated by a clock source (not shown). As indicated above, the flip-flop 410 is clocked with an input that deliberately violates the setup or hold times (or both) of the flip-flop 410 to ensure meta-stable behavior. The setup or hold times can be violated, for example, using the variable delays 415, 420. The flip-flop 410 can be embodied, for example, as a D, T or JK type flip-flop.

As indicated above, the delay from the delays 415, 420, the inherent delay in the flip-flop 410 itself, and most importantly from the non-uniform delay from the meta-stable behavior, may cause the waveform Meta-stable out to not be synchronized with the waveform Clock. Thus, to make the core random element 400 of FIG. 4 suitable for synchronous applications, an illustrative mechanism is provided in FIG. 4 to synchronize the waveform Meta-stable out with the waveform Clock.

The synchronizing circuitry 430 shown in FIG. 4 includes a number of serial flip-flops 440–442 that are selected so as to not enter a meta-stable state easily. In addition, if one of these flip-flops 440–442 does become meta-stable, the period of the clock signal should be long enough so that the output of the meta-stable flip-flop will settle to a fixed logic value (either 0 or 1), such that when the signal is sampled at the next flip-flop 440–442, the flip-flop is stable. In this manner, each flip-flop 440–442 improves the chance of synchronizing the waveform Meta-stable out with the waveform Clock, while removing any meta-stability. By comparing the output Meta stable out with the input signal, one can find occurrences when they disagree. This disagreement can only occur when one of the flip-flops in the core random element 400 has become meta-stable. Thus, an exclusive (XOR) gate serves to detect the bits generated by the core random element 400 as is shown with XOR gate 150 in the first description. For additional details on the operation of the core random element 400, see the related co-pending applications referenced above and incorporated by reference herein.

Figure 5:
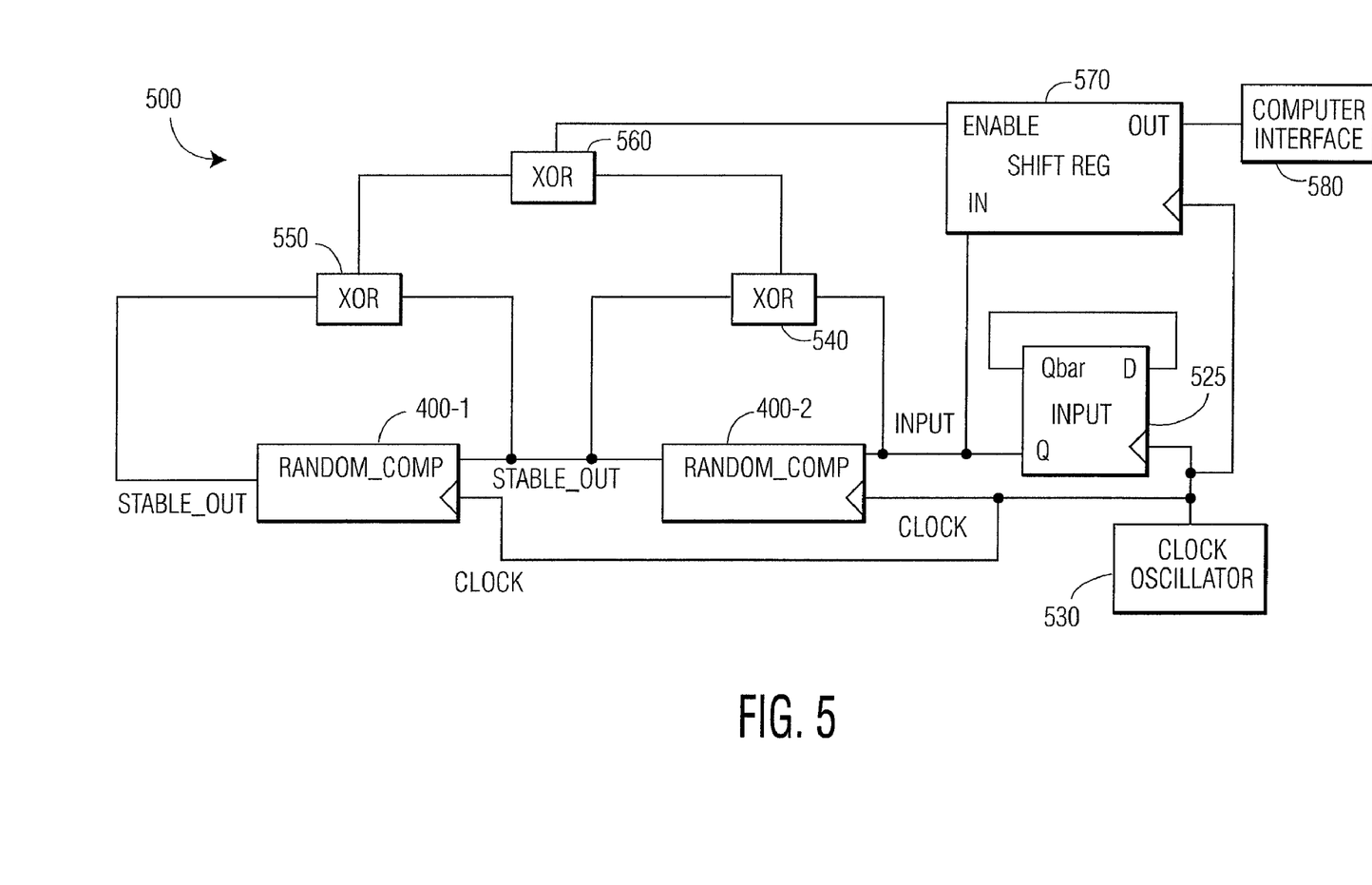
FIGS. 5 through 8 illustrate various embodiments of a random number generator in accordance with the present invention.

FIG. 5 illustrates a random number generator 500 in accordance with the present invention. As previously indicated, the present invention reduces the susceptibility of a random number generator to an attack using external noise by using a plurality of flip flops in one random number generator. In the illustrative embodiment shown in FIG. 5, the random number generator 500 includes two core random elements 400-1, 400-2, as discussed above in conjunction with FIG. 4, in series.

A clock source is generated by a clock oscillator 530 and a D-type flip-flop 525 whose Qbar output is fed back into its D input. In this manner, the D-type flip-flop 525 operates in a similar manner to a T-type flip-flop (toggled output), to provide a divide-by-two mechanism. Thus, the input of the exemplary core random element 400-1 is driven by alternating ones and zeroes. Another input signal scheme is discussed further below in conjunction with FIG. 8.

As shown in FIG. 5, the output of the core random element 400-1 is applied as an input to the second core random element 400-2. If one of the core random elements 400-1, 400-2 is influenced by noise, they both will be. Thus, if both core random elements 400-1, 400-2 issue bits at the same time, as detected by exclusive or (XOR) circuits 540, 550, there is a possibility that the random number generator 500 was influenced by noise, and all the issued bits are discarded. Thus, the random number generator 500 includes a set of exclusive or (XOR) circuits 540, 550, 560.

The first exclusive or gate ("XOR") 540 compares the synchronized version of waveform stable_out with the waveform Input (sampled at the output of the divide-by-two flip-flop 525). Since the output of the XOR gate 540 will be high if and only if two inputs differ, the output of the XOR gate 540 will be high if the waveform Stable_out from core random element 400-2 does not match the input signal which can only happen when one of the flip-flops in the core random element become meta-stable. Likewise, since the output of the XOR gate 550 will be high if and only if its two inputs differ, the output of the XOR gate 550 will be high if the waveform Stable_out from core random element 400-2 does not match the waveform Stable_out from core random element 400-1.

The outputs of the two XOR gates 540, 550 are then applied to the XOR gate 560. Since the output of the XOR gate 560 will be high if and only if its two inputs differ, the output of the XOR gate 560 will not be high if the waveforms Stable_out from both core random elements 400-1, 400-2 are high or low. In other words, the XOR gate 560 will suppress the generation of a bit only when both core random elements 400-1, 400-2 have generated bits.

The output of the XOR gate 560 is applied to an enable input of a shift register 570. Thus, the shift register 570 will shift a bit over from the marking signal, LFSR mark, from the LFSR 210 every time the waveform Stable_out from only one core 16 random element 400 does not match the input to the respective core random element 400 (i.e., when there is a "mistake"). The generated bit is then applied to a computer interface 580 (or another application).

Figure 6:
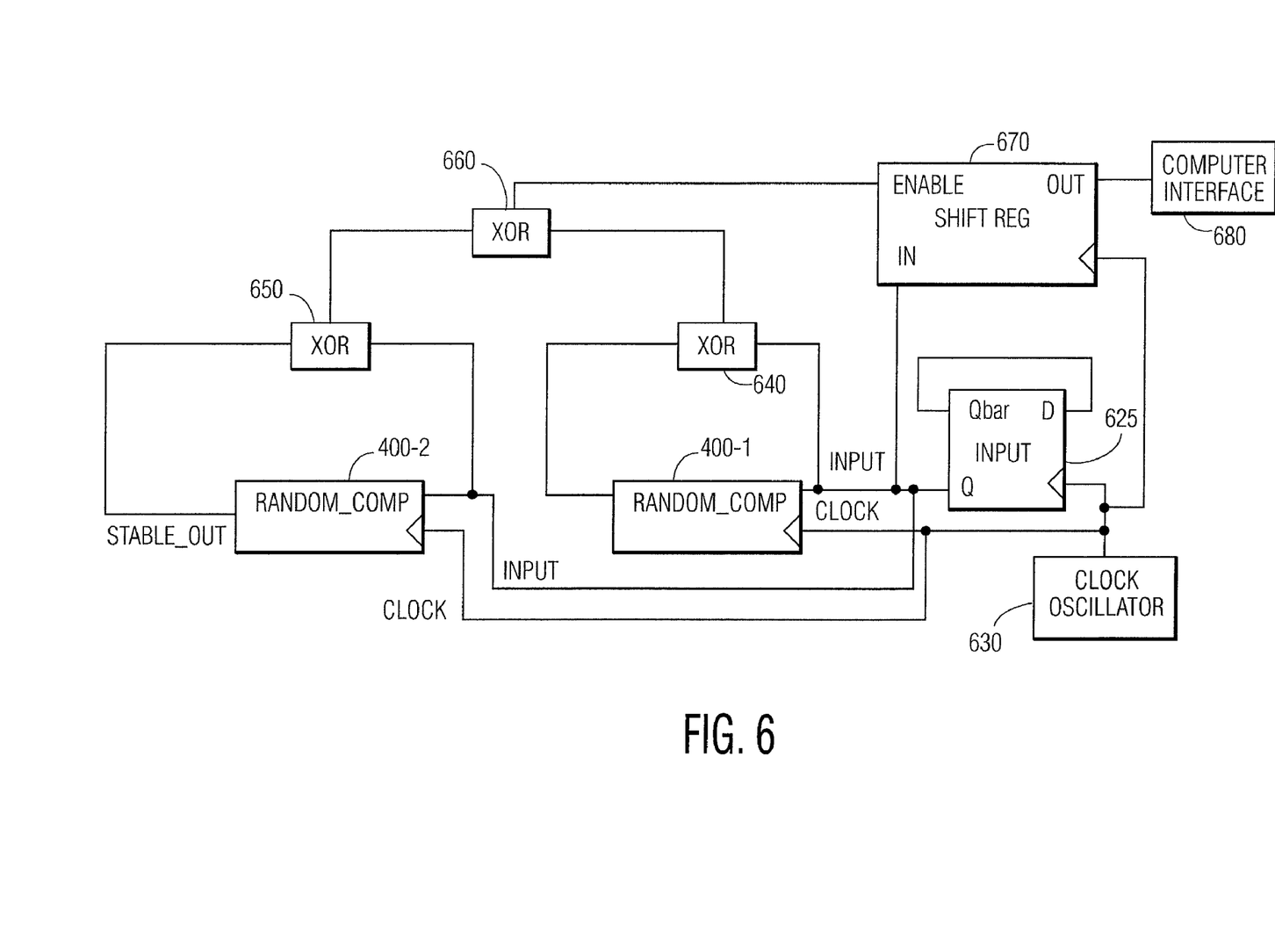

FIG. 6 illustrates a random number generator 600 in accordance with the present invention. In the illustrative embodiment shown in FIG. 6, the random number generator 600 includes two core random elements 400-1, 400-2, as discussed above in conjunction with FIG. 4, in parallel. The embodiment shown in FIG. 6 is particularly useful to prevent an attacker from using the fact that the input signal in the embodiment of FIG. 5 passes the two flip-flops at different times.

A clock source is generated by a clock oscillator 630 and a D-type flip-flop 625 whose Qbar output is fed back into its D input. In this manner, the D-type flip-flop 625 operates in a similar manner to a T-type flip-flop (toggled output), to provide a divide-by-two mechanism. Thus, the inputs of both core random elements 400-1, 400-2 in the parallel embodiment are driven by alternating ones and zeroes. Another input signal scheme is discussed further below in conjunction with FIG. 8.

As shown in FIG. 6, the random number generator 600 includes a set of exclusive or (XOR) circuits 640, 650, 660. Like the embodiment of FIG. 5, the first exclusive or gate ("XOR") 640 compares the synchronized version of waveform Stable_out with the waveform Input (sampled at the output of the divide-by-two flip-flop 625). Since the output of the XOR gate 640 will be high if and only if two inputs differ, the output of the XOR gate 640 will be high if the waveform Stable_out from core random element 400-1 does not match the input signal. Likewise, since the output of the XOR gate 650 will be high if and only if its two inputs differ, the output of the XOR gate 650 will be high if the waveform stable_out from core random element 400-2 does not match the input signal.

The outputs of the two XOR gates 640, 650 are then applied to the XOR gate 660. Since the output of the XOR gate 660 will be high if and only if its two inputs differ, the output of the XOR gate 660 will not be high if the waveforms Stable_out from both core random elements 400-1, 400-2 are high or low. In other words, the XOR gate 660 will suppress the generation of a bit only when both core random elements 400-1, 400-2 have generated bits.

The output of the XOR gate 660 is applied to an enable input of a shift register 670. Thus, the shift register 670 will shift a bit from the marking signal, LFSR mark, from the LFSR 210 every time the waveform Stable_out from only one core random element 400 does not match the input signal (i.e., when there is a "mistake"). The generated bit is then applied to a computer interface 680 (or another application).

Figure 7:
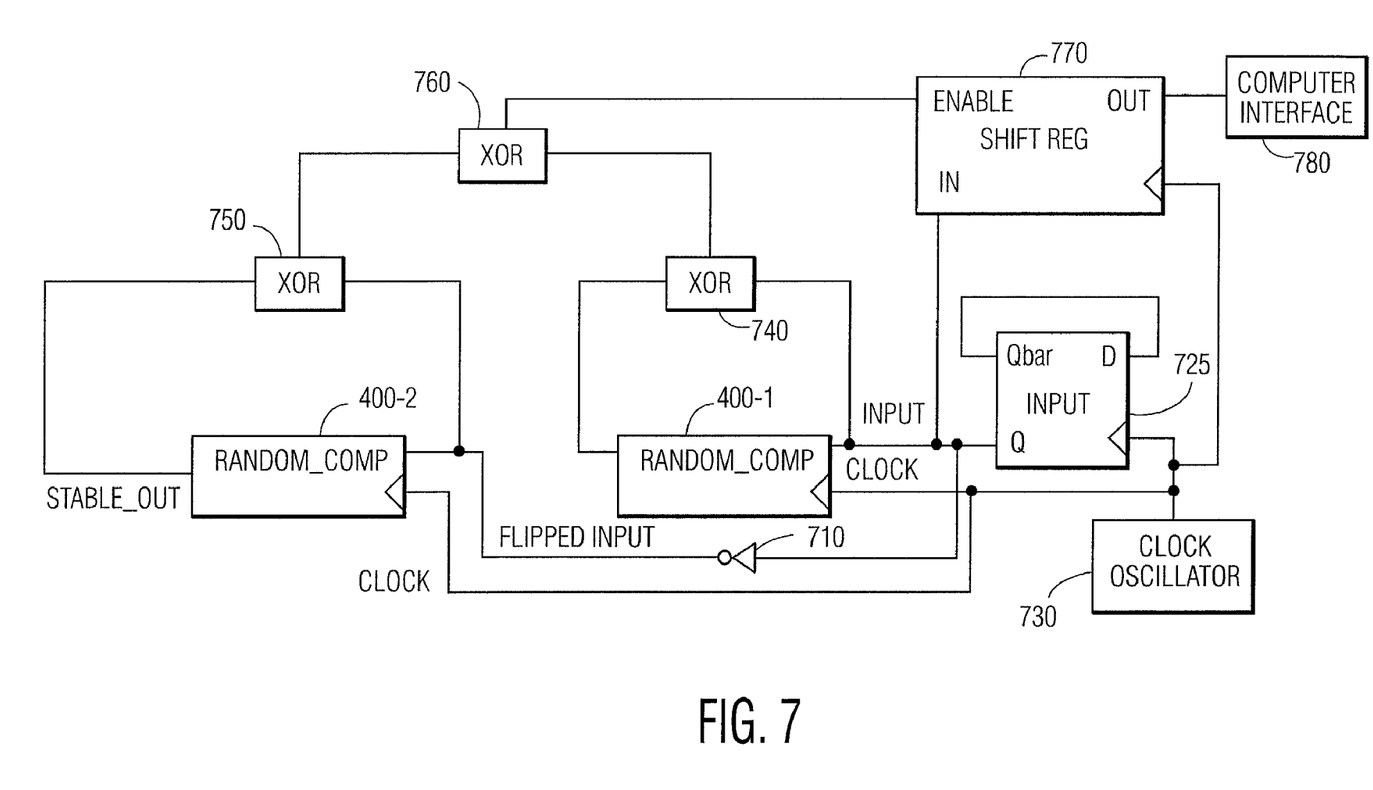

FIG. 7 illustrates a random number generator 700 in accordance with another embodiment of the present invention. In the illustrative embodiment shown in FIG. 7, the random number generator 600 includes two core random elements 400-1, 400-2, as discussed above in conjunction with FIG. 4, in parallel that uses an inverter 710 to switch the input signal for the second core random element 400-2. Thus, the core random element 400-2 never has the same input signal as the core random element 400-1. The embodiment shown in FIG. 7 can further prevent an attacker in each step of the random number generation.

The random number generator 700 operates in a similar manner to the random number generator 600, discussed above in conjunction with FIG. 6, other than for the inverter 710.

Figure 8:
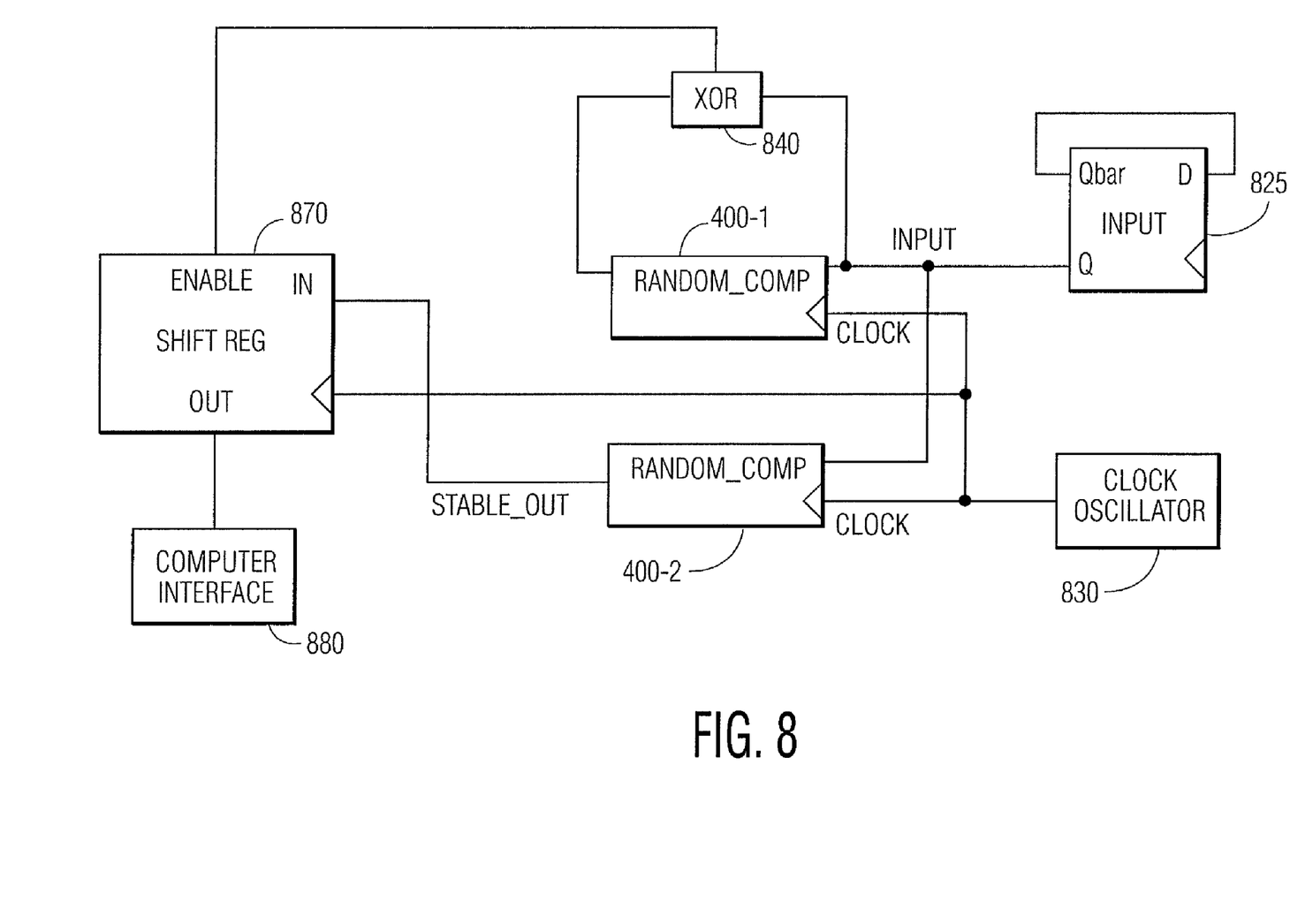

FIG. 8 illustrates a random number generator 800 in accordance with yet another embodiment of the present invention.

In the illustrative embodiment shown in FIG. 8, a first core random element 400-1 is used to trigger the generation of a random bit from another random component 400-2. More specifically, whenever a mistake is detected in the first core random element 400-1, the stable output of the second core random element 400-2 is used for the output stream. The detection of the mistake can be done in the same manner as described above, i.e., by using a plurality of core random elements 400.

As shown in FIG. 8, the random number generator 800 includes two core random elements 400-1, 400-2, as discussed above in conjunction with FIG. 4. In addition, a clock source 830 generates a clock signal. A D-type flip-flop 825 whose Qbar output is fed back into its D input provides a divide-by-two mechanism. Thus, the input of the core random element 400-1 is driven by alternating ones and zeroes.

A mistake is detected in the first random component 400-1 using the exclusive or (XOR) circuit 840. The exclusive or gate ("XOR") 840 compares the synchronized version of waveform Stable_out from core random element 400-1 with the waveform Input (sampled at the output of the divide-by-two flip-flop 825). Since the output of the XOR gate 840 will be high if and only if its two inputs differ, the output of the XOR gate 840 will be high if the waveform Stable_out from random component 400-1 does not match the input signal due to meta-stable behavior.

The output of the XOR gate 840 is applied to an enable input of a shift register 870. Thus, the shift register 870 will shift a bit over from the input signal (which is driven by the core random element 400-2) every time the waveform stable_out from core random element 400-1 does not match the input signal (i.e., when there is a "mistake"). The generated bit is then applied to a computer interface 880 (or another application). The core random element 400-2 operates in the same manner as described above in conjunction with FIG. 4.

It is to be understood that the embodiments and variations shown and described herein are merely illustrative of the principles of this invention and that various modifications may be implemented by those skilled in the art without departing from the scope and spirit of the invention.

What is claimed is:

1. A method for generating a random number, comprising the steps of:
    operating a plurality of flip-flops in a meta-stable state, each of the plurality of flip-flops being connected to delay circuitry operable to violate set-up and/or hold times of the flip-flop so as to put the flip-flop in a meta-stable state;
    generating a random bit if one of said flip-flops enter said meta-stable state;
    preventing the generation of a random bit if more than one of said plurality of flip-flops enter a meta-stable state within a predefined time interval;
    providing an input signal for a first of said flip-flops; and
    inverting the input signal for a second of said flip-flops to ensure that said second flip-flop does not have the same input signal as a first flip-flop.

* * * * *